(12) United States Patent
Kobayashi

(10) Patent No.: US 7,213,308 B2
(45) Date of Patent: May 8, 2007

(54) SEAT BELT COVER

(76) Inventor: Kyozo Kobayashi, 18-11, Sangenjaya 1-chome, Setagaya-ku, Tokyo (JP)

( * ) Notice: Subject to any disclaimer, the term of this patent is extended or adjusted under 35 U.S.C. 154(b) by 0 days.

(21) Appl. No.: 11/172,921

(22) Filed: Jul. 5, 2005

(65) Prior Publication Data

US 2005/0241124 A1 Nov. 3, 2005

Related U.S. Application Data

(63) Continuation of application No. 09/938,525, filed on Aug. 27, 2001, now Pat. No. 6,922,876.

(30) Foreign Application Priority Data

Aug. 25, 2000 (JP) .............................. 2000-255041

(51) Int. Cl.
*A44B 11/25* (2006.01)
*B60R 21/00* (2006.01)

(52) U.S. Cl. ........................................ 24/633; 297/483

(58) Field of Classification Search ................ 24/629, 24/633, 625, 634, 641, 642, 306; 280/801.1, 280/801, 808; 297/482, 483, 488
See application file for complete search history.

(56) References Cited

U.S. PATENT DOCUMENTS

| | | | |
|---|---|---|---|
| 4,057,181 A | 11/1977 | Finnigan | |
| 4,699,401 A | 10/1987 | Saenz | |
| 4,786,080 A | 11/1988 | Jay | |
| 4,921,273 A * | 5/1990 | Weightman et al. | 280/808 |
| 4,944,530 A * | 7/1990 | Spurrier | 280/801.1 |
| 5,108,152 A | 4/1992 | Reilly et al. | |
| 5,161,824 A | 11/1992 | Li | |
| 5,312,159 A | 5/1994 | Essa et al. | |
| 5,335,957 A | 8/1994 | Golder | |
| 5,387,028 A | 2/1995 | Fulgenzi et al. | |
| 5,421,614 A * | 6/1995 | Zheng | 280/801.1 |
| 5,542,590 A | 8/1996 | Pfitzenmaier | |

(Continued)

FOREIGN PATENT DOCUMENTS

GB  1 565 644  4/1980

(Continued)

*Primary Examiner*—Robert J. Sandy
*Assistant Examiner*—Andre L. Jackson
(74) *Attorney, Agent, or Firm*—Oblon, Spivak, McClelland, Maier & Neustadt, P.C.

(57) ABSTRACT

A seat belt cover comprising a flat tubular member through which a seat belt of a motor vehicle is passed to be covered therewith, wherein, the flat tubular member has i) a slit-shaped opening provided at its lower end and having a width larger than the width of a through-tongue and ii) a slit-shaped opening provided at its upper end and having a width which is enough to pass the seat belt but not enough to pass the through-tongue. Also disclosed is a seat belt cover provided with a pocket for, e.g., a cellular phone on the outside. The former seat belt cover can prevent the friction of a seat belt with clothes to keep the shoulder or breast of a coat or jacket from becoming shiny and wearing. The latter seat belt cover enables, e.g., safety driving in talking over the cellular phone during the driving of a motor vehicle.

17 Claims, 7 Drawing Sheets

U.S. PATENT DOCUMENTS

| | | |
|---|---|---|
| 5,566,871 A | 10/1996 | Weintraub |
| 5,573,306 A | 11/1996 | Galloway et al. |
| 5,795,030 A * | 8/1998 | Becker ................. 297/488 |
| 5,951,112 A * | 9/1999 | Hansson ................ 297/482 |
| RE36,587 E | 2/2000 | Tanaka et al. |
| 6,105,219 A | 8/2000 | Beadle |
| 6,138,331 A | 10/2000 | Powers |
| 6,142,575 A * | 11/2000 | Patterson ............... 297/482 |
| 6,168,195 B1 | 1/2001 | Okazaki et al. |
| 6,273,467 B1 | 8/2001 | Berke et al. |
| 6,293,589 B1 * | 9/2001 | MacDonald et al. ........ 280/808 |
| 6,409,271 B1 | 6/2002 | Caramanis |

FOREIGN PATENT DOCUMENTS

| | | |
|---|---|---|
| GB | 2 164 835 | 4/1986 |
| GB | 2236794 A | 4/1991 |
| JP | 62-56357 | 4/1987 |
| JP | 7-315160 | 12/1995 |
| JP | 2000-142313 | 5/2000 |
| KR | 97-35552 | 7/1997 |

* cited by examiner

SEAT BELT COVER

BACKGROUND OF THE INVENTION

1. Field of the Invention

This invention relates to a seat belt cover of a motor vehicle.

2. Description of the Prior Art

Seat belts of motor vehicles hold drivers and passengers firmly to seats in collisions of the motor vehicles to prevent the drivers and passengers from colliding against steering wheels, instrument panels, windshields and so forth by inertia, so as to be kept from being injured or be less injured, and are obliged to be fastened in driving.

However, especially when a driver operates a motor vehicle, the driver moves his or her body up and down, back and forth, and right and left, when a seat belt the driver uses will be wound up or off according to the driver's movement. Hence, because of friction of the seat belt with clothes, parts coming into contact with the seat belt, in particular, parts on the shoulder or breast of a coat or jacket may become shiny and wear.

To prevent this, the part of a seat belt which comes into contact with, in particular, the shoulder or breast of clothes is covered with a seat belt cover. Conventionally, this seat belt cover is fitted to the seat belt merely in the shape of a flat tube. Hence, when the seat belt is unused and it is wound up on a retractor, and if the upper end of the seat belt cover stops at the mouth of a slip guide its through-tongue is still pulled and hence the seat belt cover becomes loose in bellows or the through-tongue stops without reaching the preset position. As the result, the seat belt is not just received into its holder at the preset position when it is unused, also damaging the beauty.

In addition, in recent years, cellular phones inclusive of PHS are in wide use. Talking over the phone with someone during the driving of a motor vehicle compels one-handed driving or brings about careless driving, and may cause a traffic accident.

SUMMARY OF THE INVENTION

Under the circumstances, an object of the present invention is to provide a seat belt cover which can prevent the friction of a seat belt with clothes to keep the shoulder or breast of a coat or jacket from becoming shiny and wearing, and which, when the seat belt is unused and it is wound up on a retractor, can receive the through-tongue into the cover so that the seat belt cover may by no means become loose in bellows or the through-tongue may by no means stop without reaching the preset position, and also to provide a seat belt cover which enables safety driving without causing the hand to be restrained by talking over the cellular phone during the driving of a motor vehicle.

As a result of extensive studies, the present inventor has discovered that a seat belt cover constructed as described below can solve the above problems, and has accomplished the present invention.

More specifically, the present invention first provides a seat belt cover comprising a flat tubular member through which a seat belt of a motor vehicle is passed to be covered therewith, wherein the flat tubular member has i) a slit-shaped opening provided at its lower end and having a width larger than the width of a through-tongue and ii) a slit-shaped opening provided at its upper end and having a width which is enough to pass the seat belt but not enough to pass the through-tongue.

The present invention second provides a seat belt cover provided with a pocket on the outside surface thereof.

DESCRIPTION OF THE PREFERRED EMBODIMENT

The present invention is described below in detail.

—Seat Belt Cover—

Figure 1:
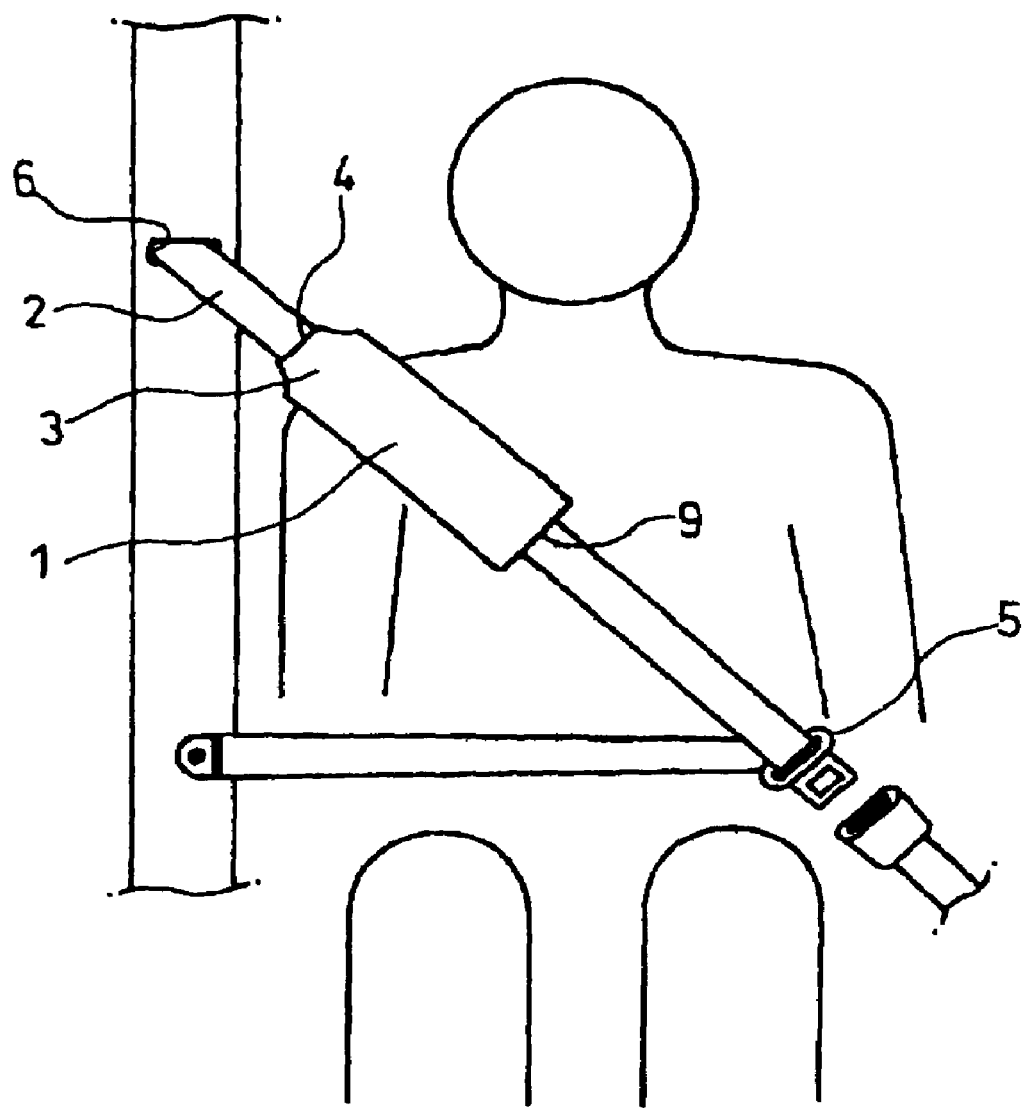
FIG. 1 is a schematic view showing how the seat belt cover of the present invention stands when fitted to a seat belt.

FIG. 1 is a schematic view showing how a seat belt cover 1 of an embodiment according to the present invention stands when fitted to a seat belt 2. The seat belt cover 1 is a substantially flat tubular member. The substantially flat tubular member has a lower end 9 having a width larger than the width of a through-tongue 5. The substantially flat tubular member has an upper portion 3 narrowed down taperingly to the end, and has an upper end having a width which is larger than the width of the seat belt 2 and is smaller than the width of the through-tongue 5 so as to pass the seat belt 2 but not to pass the through-tongue 5. However, the width of the upper end 4 may preferably be set to be only a little larger than the width of the seat belt so that the seat belt cover does not slide down when fitted to the seat belt. When a driver or a passenger moves his or her body and the seat belt is wound up or wound off according to the movement, the seat belt moves inside the seat belt cover but the seat belt cover per se does not move and stay at the position set on the body. Therefore, friction between the seat belt cover and the clothes does not occur.

Figure 2:
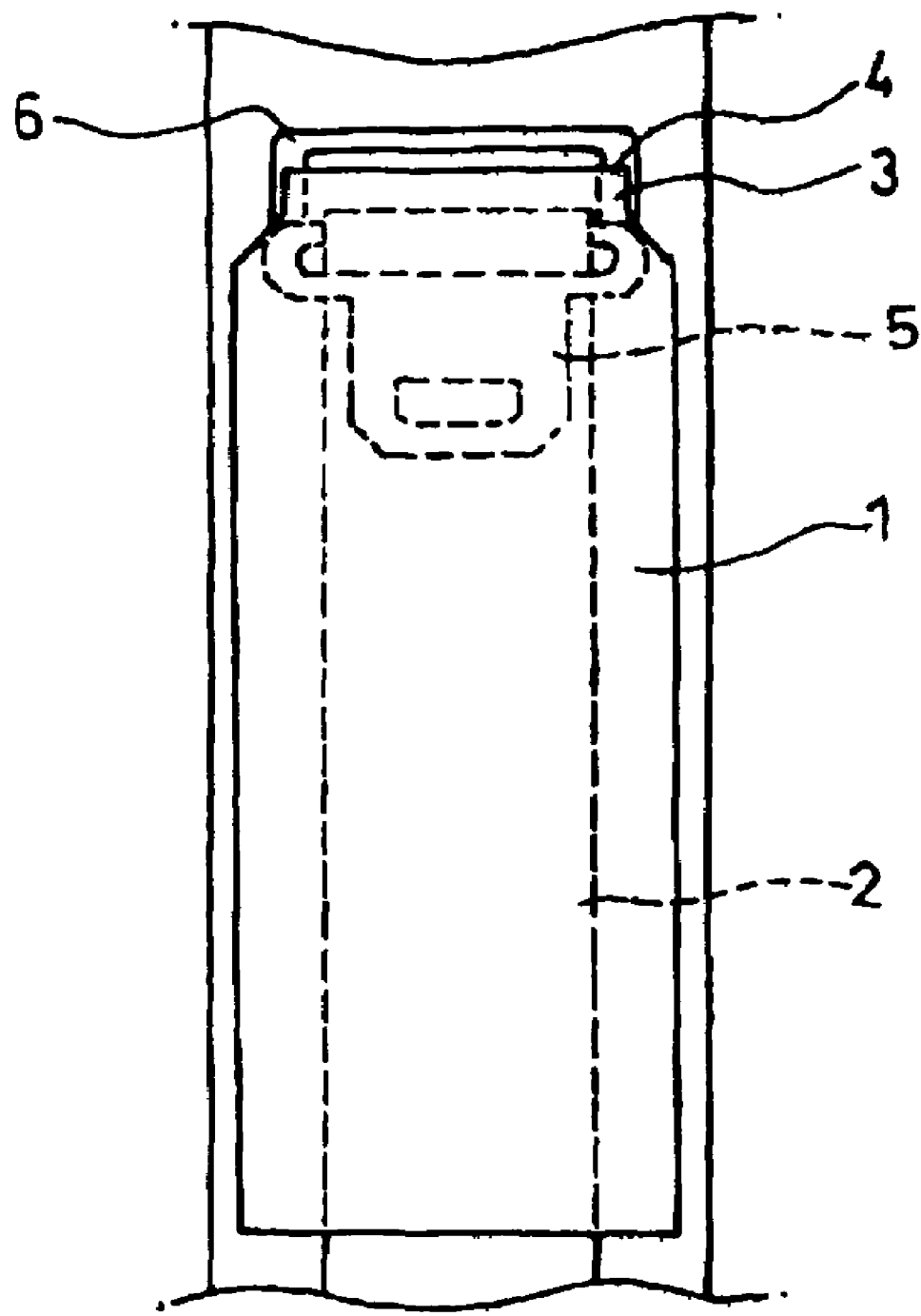
FIG. 2 is a schematic view showing how the seat belt stands received into the seat belt cover when the seat belt is unused.

When the seat belt is unused, the seat belt 2 is wound up on a retractor (not shown) provided in the body of a car. As shown in FIG. 2, the upper end 4 of the seat belt 1 stops at a slip guide 6 and at the same time the through-tongue 5 is received into the interior of the seat belt cover 1. Thus, the through-tongue 5 can stop at the preset position without making the seat belt cover become loose in bellows.

Figure 3:
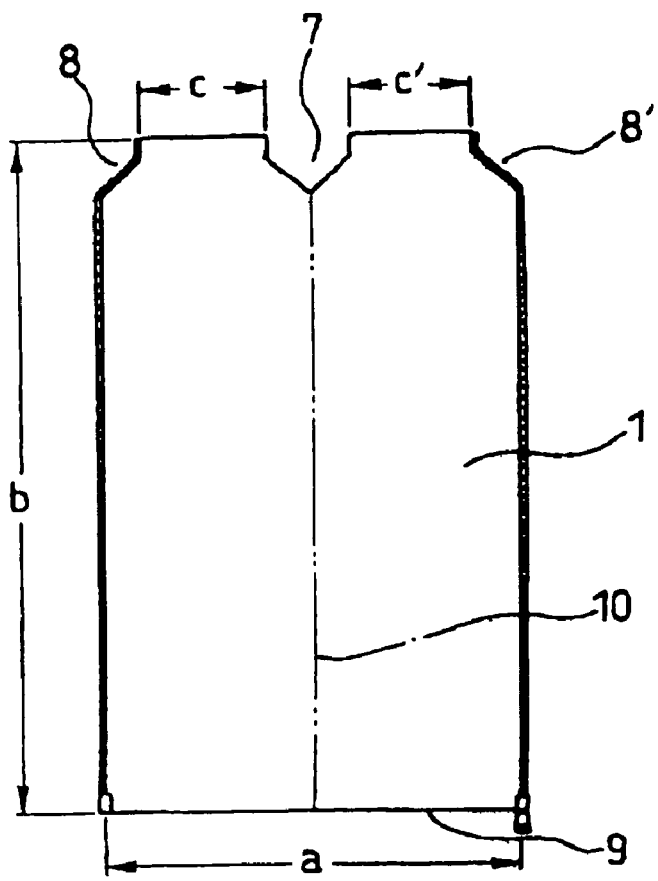
FIG. 3 is an unfolded view of the inside of the seat belt cover of the present invention.

FIG. 3 is an unfolded view of the inside of the seat belt cover 1 of the present invention. As shown in FIG. 3, a substantially rectangular material has one short side having a width a which is larger than the two-fold of the width of the through-tongue 5, and has the other short side provided with a notch 7 at the middle and notches 8 and 8' on the both ends. Its portions c and c' excluding the notch 7 and notches 8 an 8' each have a width which is larger than the width of the seat belt 2 and is smaller than the width of the through-tongue 5. The substantially rectangular material has a long side having a length b which is larger than the length over which the seat belt cover comes into contact with the shoulder and breast, which may preferably be about 30~50 cm. The substantially flat tubular member is formed by folding the substantially rectangular material inward along a middle line 10, joining or stitching the edges of the notch 7 at the middle, providing, e.g., an open-type slide fastener (zipper) or a Velcro closure along the both side edges, and closing or joining it from the lower end to the upper end or from the upper end to the lower end.

Figure 7:
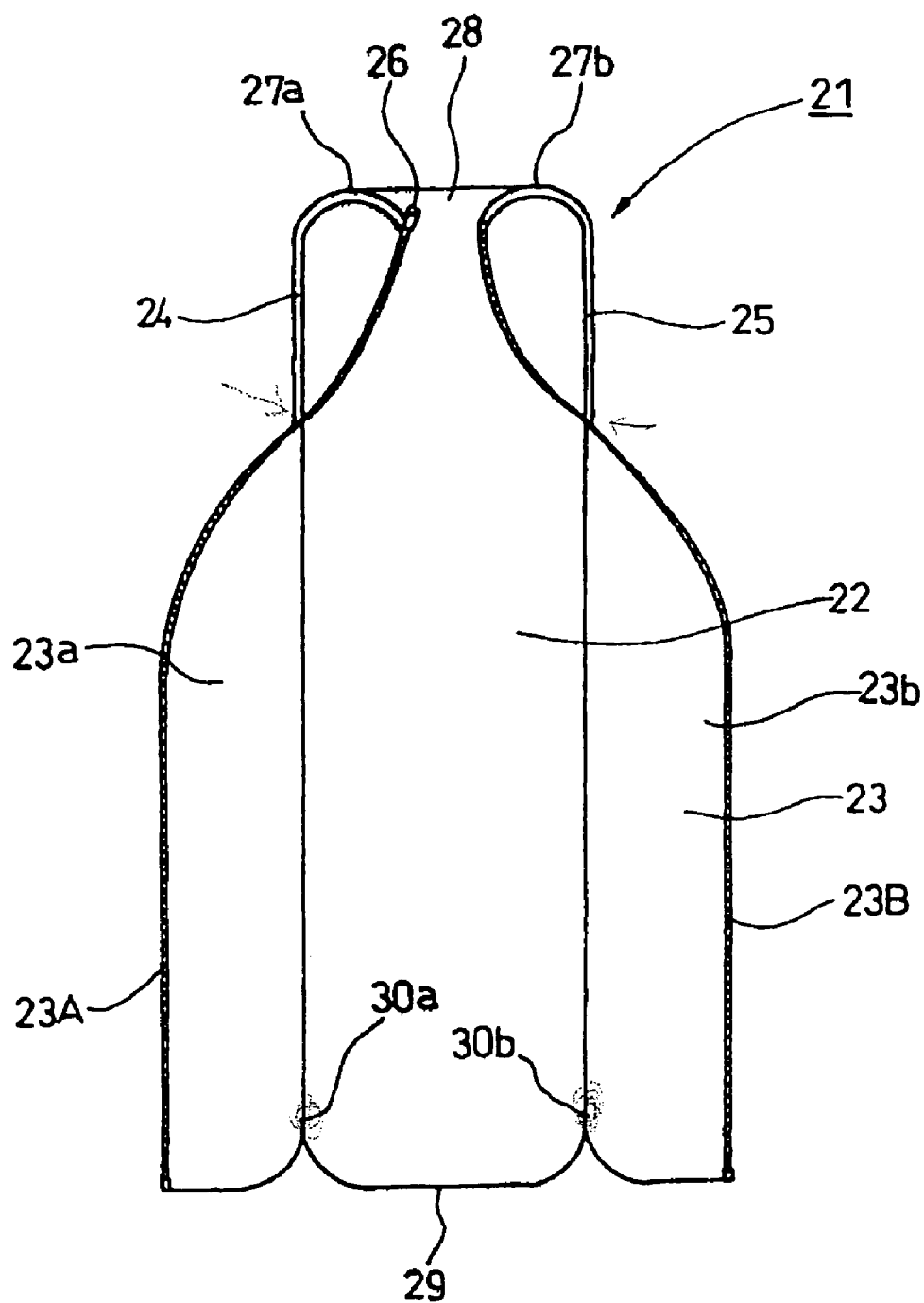
FIG. 7 is an unfolded view showing another embodiment of the seat belt cover.
Figure 8:
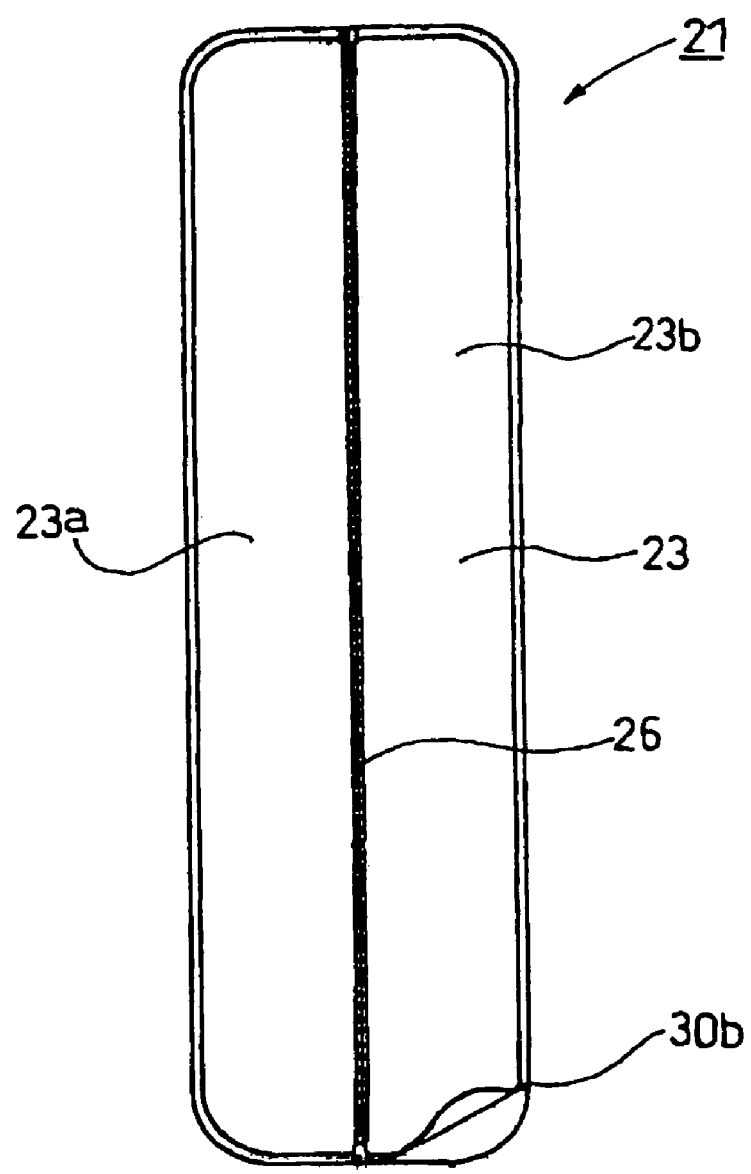
FIG. 8 is a view showing how the seat belt cover shown in FIG. 7 stands when zipped up.

A preferred embodiment of the seat belt cover of the present invention is shown in FIGS. 7 and 8. FIG. 7 shows a state in which the seat belt cover is zipped down, and FIG. 8 a state in which the seat belt cover is zipped up.

In FIGS. 7 and 8, a flat-tubular seat belt cover 21 comprises an outside (i.e., the side on which the seat belt cover does not come into contact with the shoulder or breast when used) beltlike member 22 and an inside (i.e., the side on which it comes into contact with the shoulder or breast when used) beltlike member 23. The inside beltlike member 23 comprises two beltlike submembers 23a and 23b which are separable from each other along a line extending in the longitudinal direction, and preferably along the middle line, so as to be detachable from the seat belt. One side end 24 of the inside beltlike member is joined to one side end of the outside beltlike member and the other side end 25 of the inside beltlike member is joined to the other side end of the outside beltlike member. A flat tube is thus constructed. On the other side ends 23A and 23B of the beltlike submembers 23a and 23b, respectively, a zip-up or zip-down operable slide fastener 26 is provided so that the seat belt cover can readily be attached to or detached from the seat belt.

In the embodiment shown in FIGS. 7 and 8, the side ends 24 and 25 of the inside beltlike member 23 are joined to the corresponding side ends of the outside beltlike member 22 over almost the whole length of each side end. They are further so joined as to extend partly to rounded upper end from their upper portions and reach the positions 27a and 27b on the upper end. Thus, when the inside beltlike member 23 is zipped up, the width of a slit-shaped opening 28 formed at the upper end is so set as to be larger than the width of the seat belt and be smaller than the crosswise width of the through-tongue. Hence, the seat belt can pass through this opening but the through-tongue is stopped inside this opening.

In the present invention, a slit-shaped opening made at the lower end of the flat-tubular seat belt cover is notched upward at the right-and-left both ends of the opening. Notching the lower-end opening at the both ends in this way brings about an advantage that the seat belt and the through-tongue, in particular, the through-tongue can more smoothly come into or come out of the seat belt cover when the seat belt is fastened or unfastened in the state the seat belt cover is kept fitted to the seat belt. The length of the notches in the longitudinal direction of the seat belt cover is preferably in a range of 3 to 6 cm.

In this respect, in the embodiment shown in FIGS. 7 and 8, the side ends 24 and 25 of the inside beltlike member 23 are so joined to the side ends of the outside beltlike member 22 as to stop at positions 30a and 30b which are a little upper than the lower end 29. Thus, when the slide fastener 26 is operated to zip up the seat belt cover into a flat-tubular member, the slit-shaped opening formed at the lower end has such a form that the opening has been notched at right and left.

The seat belt cover may be kept fitted to the seat belt, or may be kept detached when unused.

The seat belt cover may be made of any material as long as it can retain its shape when the through-tongue is received into it, and is a non-frictional material. For example, it may include thick cloths such as felt, and synthetic leather, leather and quilting. Also, the seat belt cover may be made of a non-frictional material on the inside, i.e., the side coming into contact with the shoulder and breast and a shape-retentive material on the outside, i.e., the non-contact side. A cushioning material, e.g., a urethane foam may also be put into at least the beltlike member on the contact side so that the fit feeling when the seat belt is fastened can be improved. Some people, especially women, may have a feeling of being pressed when using a seat belt, or an unpleasant feeling or a feeling of a pain when wearing summer clothes exposing skin partly at shoulder, etc. which is directly brought into contact with the seat belt. However, since the seat belt cover is quite wider than the seat belt and further a cushioning material is incorporated or filled in at least the inside beltlike member of the seat belt cover, not only the unpleasant feeling caused by the direct contact but also the feeling of being pressed and the feeling of a pain are markedly reduced because the pressure is scattered.

It is possible to make various designs on the outside surface of the seat belt cover to thereby enhance fashionability.

—Seat Belt Cover with Pocket—

A seat belt cover used as a base of the seat belt cover with pocket according to the present invention may be the seat belt cover of the present invention described above, or may be a conventional seat belt cover. Anything may be held in the pocket. For example, it may include a cellular phone inclusive of PHS, glasses, a pack of cigarette, a pocketbook, a purse and so forth. A case in which a cellular phone is held in is given in the following description.

Figure 4:
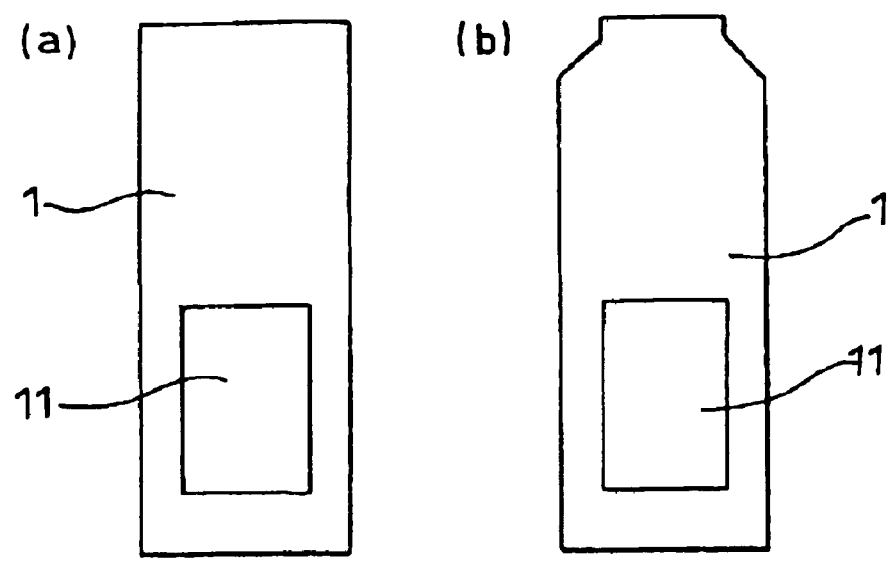
FIG. 4 illustrates schematic plan views each showing how a seat belt cover is provided with a cellular phone-holding pocket.

In FIG. 4, (a) illustrates a schematic plan view showing a seat belt cover with a pocket according to the present invention, comprising a conventional seat belt cover 1 provided with a cellular phone-holding pocket 11.

In FIG. 4, (b) illustrates a schematic plan view showing another seat belt cover with a pocket according to the present invention, comprising the seat belt cover 1 of the present invention described above, further provided with a-phone-holding pocket 11. The cellular phone-holding pocket 11 may have such a size that it can receive a cellular phone. As materials for the pocket, there are no particular limitations thereon. The same materials as those for the seat belt cover may be used. Instead, a net-like or mesh-like material may be used as a material of the pocket and a cellular phone may be kept inserted in the pocket, where the driver can talk over the phone without any interruption of a voice due to the material of which the pocket is made, thereby enabling safety driving without causing the hand to be restrained by talking over the phone during the driving of a motor vehicle.

Figure 5:
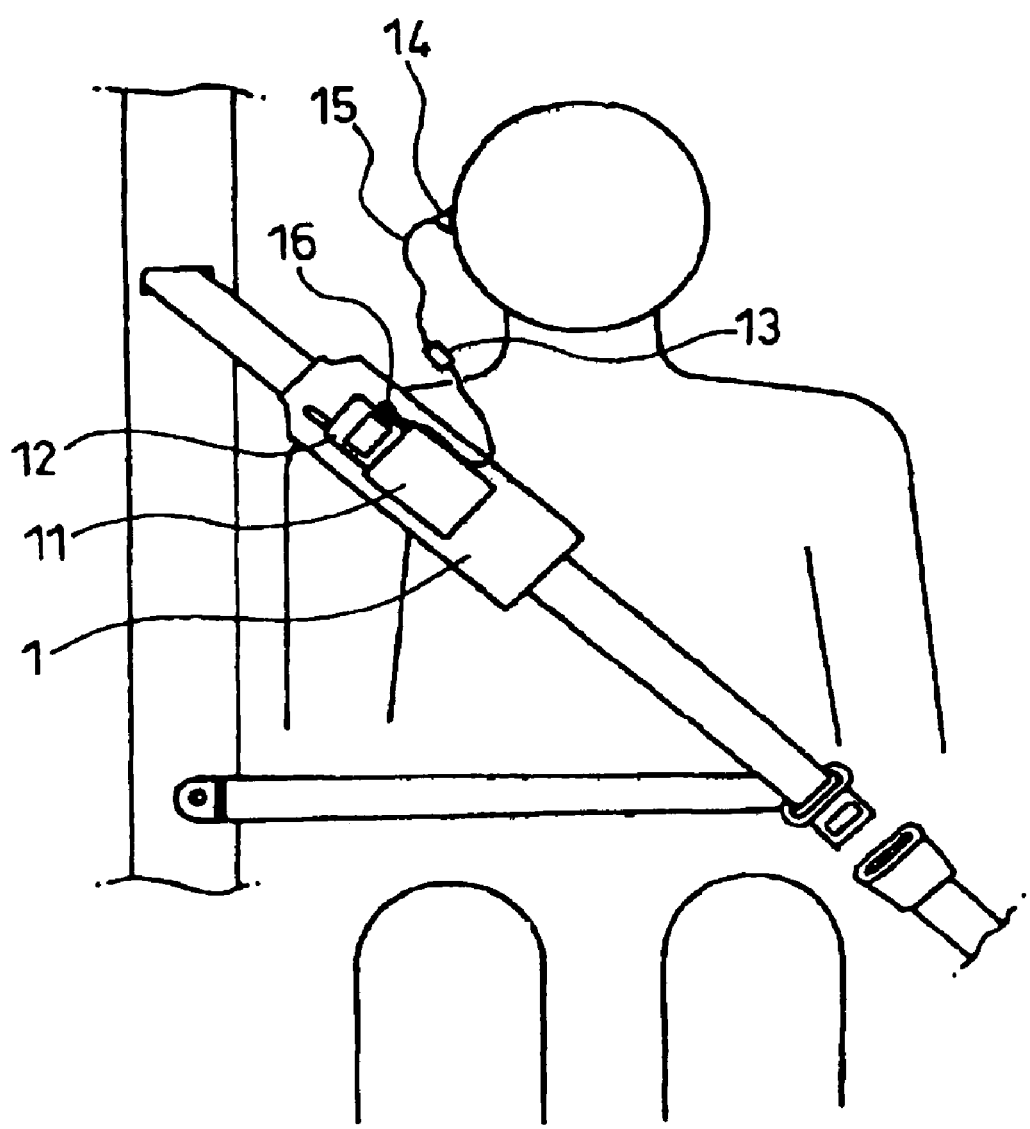
FIG. 5 is a view showing how a driver talks over a cellular phone put into the cellular phone-holding pocket provided on the seat belt cover.

FIG. 5 is a view showing how a driver talks over a cellular phone 12 put into the cellular phone-holding pocket 11 provided on the seat belt cover 1. Here, a connecting terminal 16 on one end of an extension cord 15 provided with a microphone 13 and an earphone 14 is inserted and connected to a microphone-earphone jack of a cellular phone 12, and the microphone 13 is so set as to come near to driver's mouth. This enables safety driving without causing the hand to be restrained by talking over the phone during the driving of a motor vehicle.

Figure 6:
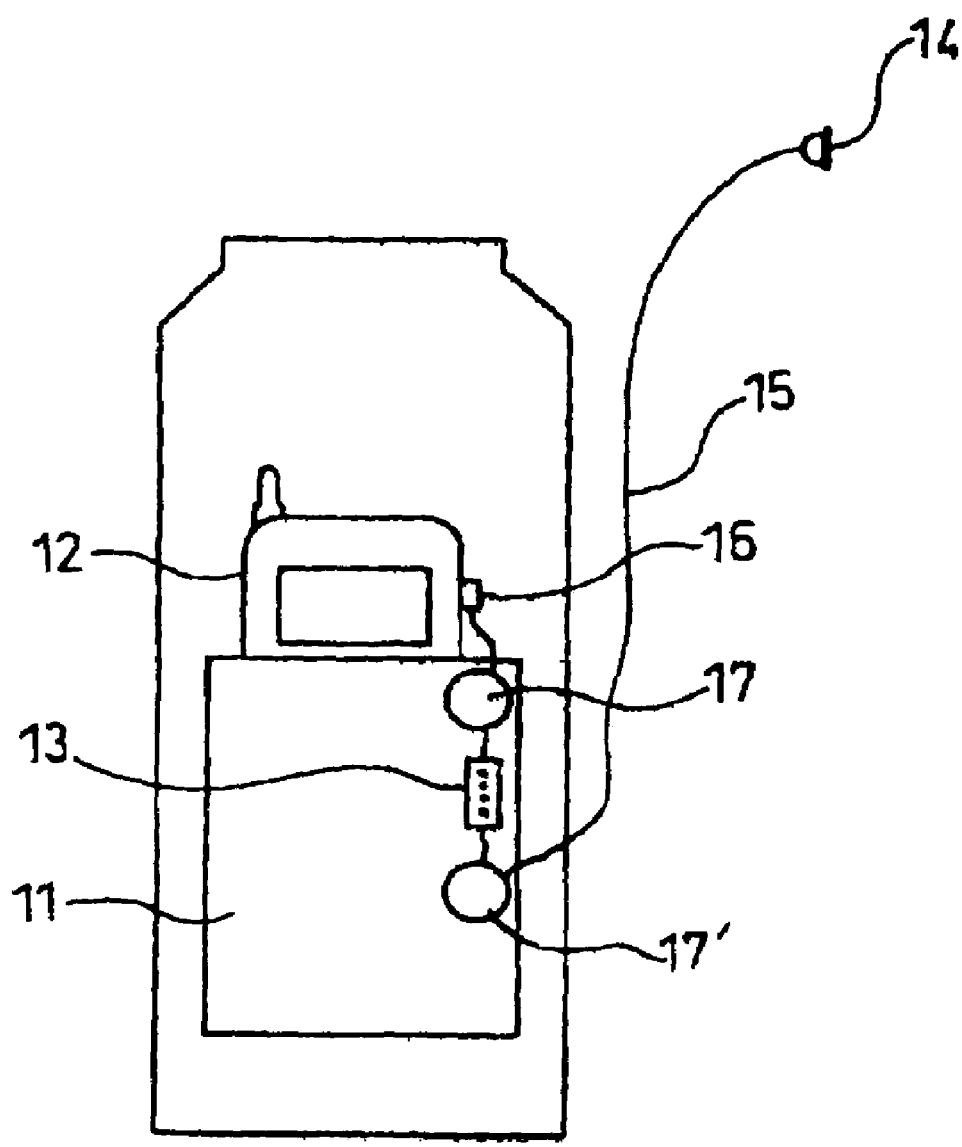
FIG. 6 is a view showing another cellular phone which stands put into the cellular phone-holding pocket provided on the seat belt cover.

As the cellular phone used here, it is preferable to use a cellular phone constructed in the following way. That is, as shown in FIG. 6, in an extension cord 15 having a microphone 13 and an earphone 14 and inserted and connected to the main body of a cellular phone 12 through a connecting terminal 16, a wind-up device 17 with a stopper is previously provided between the connecting terminal 16 and the microphone 13, and another wind-up device 17' with a stopper between the microphone 13 and the earphone 14. The wind-up device 17 with a stopper is operated to adjust the distance between the connecting terminal 16 and the microphone 13 so that the microphone 13 may lie on the seat belt cover 1 (i.e., on the breast) and may just come to the position where the voice can be picked up. The wind-up device 17' with a stopper is also operated to previously remove any looseness of the extension cord between the microphone 13 and the earphone 14. Thus, the driver can clearly talk over the phone, and the extension cord 15 can be prevented from tangling, to more promise safety.

The wind-up device with a stopper is meant to be a device incorporated with a mechanism which can automatically wind up the cord and moreover can arbitrarily stop winding up so that the cord wound back can be in the desired length. It is a known and commonly used device used widely in reelers of, e.g., tape measures and vacuum cleaners. An example in which an earphone is provided with such a device is disclosed in Japanese Laid-open Publication (Kokai) No. 10-294984.

As described above, the seat belt cover of the present invention, when fitted to the seat belt, can prevent the friction of the seat belt with a coat or jacket and can keep the shoulder or breast of the coat or jacket from becoming shiny and worn. Also, when the seat belt is unused and it is wound up on the retractor, the seat belt cover can receive the through-tongue into the cover so that the seat belt cover may by no means become loose in bellows or the through-tongue may by no means stop without reaching the preset position. Hence, the seat belt can just be received into the holder at its preset position, and also the beauty is not damaged.

What is claimed is:

1. A seat belt cover for covering a seat belt used in a seat belt system of a motor vehicle for holding an occupant, said seat belt system comprising:
    a single seat belt which is fixed to the body of the motor vehicle at its lower end,
    a retractor which is provided on the body of the motor vehicle for retractably wind or unwind the seat belt at the upper end of the seatbelt,
    a slip guide which guides the seat belt to said retractor when the seat belt is wound up, and
    a through-tongue which has an aperture through which the seat belt passes and moves freely and which is detachably secured to the body of the motor vehicle;
    said seat belt cover comprising a flat tubular member through which said seat belt is passed to be covered partially therewith,
    wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
    wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
    wherein said flat tubular member comprises:
    an outside beltlike member having a top end and a bottom end disposed away from the top end along a longitudinal axis, and first and second connecting edges disposed between the top and bottom ends and disposed opposite one another;
    an inside beltlike member comprising a left beltlike submember having two edges along a longitudinal axis, and a right beltlike submember having two edges along a longitudinal axis, one of the two edges of the left beltlike submember being connected to or integral with the first connecting edge of said outside beltlike member, and one of the two edges of the right beltlike submember being connected to or integral with the second connecting edge of the outside beltlike member, and the remaining edge of the left beltlike submember being adapted to detachably fasten with the remaining edge of the right beltlike submember.

2. A seat belt system of a motor vehicle for holding an occupant, comprising:
    a single seat belt which is fixed to the body of the motor vehicle at its lower end,
    a seat belt cover for covering the seat belt,
    a retractor which is provided on the body of the motor vehicle for retractably wind or unwind the seat belt at the upper end of the seatbelt.
    a slip guide which guides the seat belt to said retractor when the seat belt is wound up, and
    a through-tongue which has an aperture through which the seat belt passes and moves freely and which is detachably secured to the body of the motor vehicle;
    said seat belt cover comprising a flat tubular member through which said seat belt is passed to be covered partially therewith,
    wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
    wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
    wherein said flat tubular member comprises:
    an outside beltlike member having a top end and a bottom end disposed away from the top end along a longitudinal axis, and first and second connecting edges disposed between the top and bottom ends and disposed opposite one another;
    an inside beltlike member comprising a left beltlike submember having two edges along a longitudinal axis, and a right beltlike submember having two edges along a longitudinal axis, one of the two edges of the left beltlike submember being connected to or integral with the first connecting edge of said outside beltlike member, and one of the two edges of the right beltlike submember being connected to or integral with the second connecting edge of the outside beltlike member, and the remaining edge of the left beltlike submember being adapted to detachably fasten with the remaining edge of the right beltlike submember.

3. A seat belt cover for covering a seat belt used in a seat belt system of a motor vehicle for holding an occupant, said seat belt system comprising:
a single seat belt which is fixed to the body of the motor vehicle at its lower end,
a retractor which is provided on the body of the motor vehicle for retractably wind or unwind the seat belt at the upper end of the seatbelt,
a slip guide which guides the seat belt to said retractor when the seat belt is wound up, and
a through-tongue which has an aperture through which the seat belt passes and moves freely and which is detachably secured to the body of the motor vehicle;
said seat belt cover comprising a flat tubular member through which said seat belt is passed to be covered partially therewith,
wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
wherein the slit-shaped opening made at the lower end of the flat tubular seat belt cover is notched upward at right-and-left ends of the opening.

4. A seat belt system of a motor vehicle for holding an occupant, comprising:
a single seat belt which is fixed to the body of the motor vehicle at its lower end,
a seat belt cover for covering the seat belt,
a retractor which is provided on the body of the motor vehicle for retractably wind or unwind the seat belt at the upper end of the seatbelt,
a slip guide which guides the seat belt to said retractor when the seat belt is wound up, and
a through-tongue which has an aperture through which the seat belt passes and moves freely and which is detachably secured to the body of the motor vehicle;
said seat belt cover comprising a flat tubular member through which said seat belt is passed to be covered partially therewith,
wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
wherein the slit-shaped opening made at the lower end of the flat-tubular seat belt cover is notched upward at right-and-left ends of the opening.

5. A seat belt cover for covering a seat belt used in a seat belt system including a seat belt fixed to a body at a lower end, a retractor provided on the body to wind or unwind an upper end of the seat belt, a slip guide that guides the seat belt towards the retractor, and a through-tongue having an aperture through which the seat belt passes and moves freely and which is detachably secured to the body, said seat belt cover comprising:
a flat tubular member having a first opening on one end and a second opening on an opposite end, said flat tubular member being configured to receive the seat belt therethrough from said one end to said opposite end,
wherein said first opening has a width configured to be larger than a width of the through-tongue and said second opening has a width configured to allow the seat belt to pass therethrough but not enough to allow the through-tongue to pass therethrough, and
wherein said seat belt cover receives the through-tongue within an interior of said seat cover through said first opening, wherein said first opening of the flat tubular member is notched upward at right and left ends thereof.

6. A seat belt cover for covering a seat belt used in a seat belt system of a motor vehicle for holding an occupant,
said seat belt system comprising:
a single seat belt which is fixed to the body of the motor vehicle at its lower end,
a retractor which is provided on the body of the motor vehicle for retractably wind or unwind the seat belt at the upper end of the seatbelt,
a slip guide which guides the seat belt to said retractor when the seat belt is wound up, and
a through-tongue which has an aperture through which the seat belt passes and moves freely and which is detachably secured to the body of the motor vehicle;
said seat belt cover comprising a flat tubular member through which said seat belt is passed to be covered partially therewith,
wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
wherein said flat tubular member has only two openings, and one of which is said slit-shaped opening provided at the lower end and the other opening is said slit-shaped opening provided at the upper end.

7. The seat belt cover according to claim 6, wherein said flat tubular member comprises:
an outside beltlike member having a top end, and a bottom end disposed away from the top end along a longitudinal axis, and a connecting edge and a fastening edge disposed between the top and bottom ends and disposed opposite one another, and
an inside beltlike member having a top end, and a bottom end disposed away from the top end along a longitudinal axis, and a connecting edge and a fastening edge disposed between the top and bottom ends and disposed opposite one another;
the connecting edge of the outside beltlike member being connected to or integral with the connecting edge of the inside beltlike member, and the fastening edge of the outside beltlike member being adapted to detachably fasten with the fastening edge of the inside beltlike member.

8. The seat belt cover according to claim 6, wherein said flat tubular member comprises an outside beltlike member and an inside beltlike member; at least said inside beltlike member comprising a cushioning material provided internally.

9. The seat belt cover according to claim 6, which further comprises a pocket provided on the outside surface thereof.

10. The seat belt cover according to claim 9, wherein said pocket is a pocket for holding a cellular phone therein.

11. A seat belt system of a motor vehicle for holding an occupant, comprising:
    a single seat belt which is fixed to the body of the motor vehicle at its lower end,
    a seat belt cover for covering the seat belt,
    a retractor which is provided on the body of the motor vehicle for retractably wind or unwind the seat belt at the upper end of the seatbelt,
    a slip guide which guides the seat belt to said retractor when the seat belt is wound up, and
    a through-tongue which has an aperture through which the seat belt passes and moves freely and which is detachably secured to the body of the motor vehicle;
    said seat belt cover comprising a flat tubular member through which said seat belt is passed to be covered partially therewith,
    wherein said flat tubular member has i) a slit-shaped opening provided at its lower end and having a width larger than the width of said through-tongue and ii) a slit-shaped opening provided at its upper end and having a width which is enough to pass the seat belt but not enough to pass the through-tongue,
    wherein the seat belt cover is so constructed that, when the seat belt is unused and the seat belt is wound up on said retractor, the upper end of said seat belt cover stops at said slip guide, and at the same time the through-tongue is received into the interior of said seat belt cover and stops at the upper end of the seat belt cover, and
    wherein said flat tubular member has only two openings, and one of which is said slit-shaped opening provided at the lower end and the other opening is said slit-shaped opening provided at the upper end.

12. The seat belt system according to claim 11, wherein said flat tubular member comprises:
    an outside beltlike member having a top end, and a bottom end disposed away from the top end along a longitudinal axis, and a connecting edge and a fastening edge disposed between the top and bottom ends and disposed opposite one another, and an inside beltlike member having a top end, and a bottom end disposed away from the top end along a longitudinal axis, and a connecting edge and a fastening edge disposed between the top and bottom ends and disposed opposite one another;
    the connecting edge of the outside beltlike member being connected to or integral with the connecting edge of the inside beltlike member, and the fastening edge of the outside beltlike member being adapted to detachably fasten with the fastening edge of the inside beltlike member.

13. The seat belt system according to claim 11, wherein said flat tubular member comprises an outside beltlike member and an inside beltlike member; at least said inside beltlike member comprising a cushioning material provided internally.

14. The seat belt system according to claim 11, which further comprises a pocket provided on the outside surface thereof.

15. The seat belt system according to claim 14, wherein said pocket is a pocket for holding a cellular phone therein.

16. A seat belt cover for covering a seat belt used in a seat belt system including a seat belt fixed to a body at a lower end, a retractor provided on the body to wind or unwind an upper end of the seat belt, a slip guide that guides the seat belt towards the retractor, and a through-tongue having an aperture through which the seat belt passes and moves freely and which is detachably secured to the body, said seat belt cover comprising:
    a flat tubular member having a first opening on one end and a second opening on an opposite end, said flat tubular member being configured to receive the seat belt therethrough from said one end to said opposite end,
    wherein said first opening has a width configured to be larger than a width of the through-tongue and said second opening has a width configured to allow the seat belt to pass therethrough but not enough to allow the through-tongue to pass therethrough,
    wherein said seat belt cover receives the through-tongue within an interior of said seat cover through said first opening, and
    wherein said flat tubular member has only two openings, and one of which is said first opening and the other opening is said second opening.

17. The seat belt cover according to claim 16, further comprising a pocket provided on an outside surface of said flat tubular member.

* * * * *